(12) United States Patent
Fox

(10) Patent No.: US 8,651,408 B1
(45) Date of Patent: Feb. 18, 2014

(54) LIVESTOCK FEED MIXER

(75) Inventor: Harvey Z. Fox, Curtiss, WI (US)

(73) Assignee: Cloverdale Equipment LLC, Curtiss, WI (US)

( * ) Notice: Subject to any disclaimer, the term of this patent is extended or adjusted under 35 U.S.C. 154(b) by 354 days.

(21) Appl. No.: 13/108,056

(22) Filed: May 16, 2011

(51) Int. Cl.
    *B02C 19/22* (2006.01)

(52) U.S. Cl.
    USPC ........................................... 241/261.1

(58) Field of Classification Search
    USPC .................. 241/260.1, 285.1, 285.2, 285.3; 366/603
    See application file for complete search history.

(56) References Cited

U.S. PATENT DOCUMENTS

| | | |
|---|---|---|
| 3,415,492 A | 12/1968 | Rule |
| 4,707,140 A | 11/1987 | Mohrlang |
| 5,143,310 A | 9/1992 | Neier |
| 5,240,321 A | 8/1993 | Miller |
| 5,429,436 A * | 7/1995 | Stone ............................. 366/141 |
| 5,601,362 A | 2/1997 | Schuler |
| 5,647,665 A | 7/1997 | Schuler |
| 5,863,122 A * | 1/1999 | Tamminga ..................... 366/314 |
| 6,328,465 B1 * | 12/2001 | Tamminga ..................... 366/314 |
| 6,575,615 B2 | 6/2003 | Rowe et al. |
| 6,863,433 B2 * | 3/2005 | Knight .......................... 366/314 |
| 6,945,485 B1 * | 9/2005 | Douglas ................. 241/101.761 |
| 2005/0036402 A1 * | 2/2005 | Knight .......................... 366/314 |
| 2010/0039885 A1 | 2/2010 | Baker |
| 2010/0108794 A1 * | 5/2010 | Tamminga ................. 241/260.1 |

* cited by examiner

*Primary Examiner* — Faye Francis
(74) *Attorney, Agent, or Firm* — Nikolai & Mersereau, P.A.; Thomas J. Nikolai

(57) ABSTRACT

A vertical auger mixer for blending feed ingredients for farm animals has a frusto-conical shaped tub having an open top, a closed bottom and a motor-driven auger journaled for rotation about a vertical axis in the closed bottom. The tub has a discharge opening in a sidewall thereof, the opening having a door movable between an open and closed position. The tub is mounted on a base frame with plural load cells operatively disposed between the base frame and the tub such that the contents of the tub can be weighed and the tub can be rotated to fit installation requirements. An L-shaped tub reinforcing band is welded about the tub surrounding its upper rim in a way that inhibits unwanted collection of feed materials.

11 Claims, 7 Drawing Sheets

LIVESTOCK FEED MIXER

BACKGROUND OF THE INVENTION

I. Field of the Invention

This invention relates generally to machinery for processing livestock feed, and more particularly to an improved mixer for blending various ingredients to be fed to dairy herds and other agricultural animals.

II. Discussion of the Prior Art

Dairy operations typically include the milking cowherd with some of the cow population in the non-lactation stage (dry cows) and with growing heifers. Distinctly different diets are required for each of these three stages of the lifecycle, resulting in great differences in the volumes and nutrient composition of the feed to be given to such a herd. In that feed is the major cost associated with dairy production, one way to reduce or control feed costs in dairy farms is to maximize the use of forages in rations. For example, high quality legumes and grasses provide dairy cows and heifers with a good source of protein energy, fiber and minerals. Corn silage is a high energy feed that supplies fiber as well as grain. However, poor growing, harvesting and/or drying conditions often result in a low supply of high quality forages. If all low quality forages are fed to dairy cows, decreases in intake often result, and milk production decreases because of insufficient nutrients. When dairy producers are forced to feed low quality forages, one option is to look for low cost alternative or byproduct feeds to substitute for some of the low quality forages in the ration.

Additives to available forages include protein supplements such as soybean meal, canola meal, sunflower meal, dried distillers grains as well as a variety of other byproducts of the milling and brewing industries. A variety of grains is also frequently included in cattle feed with oats, barley and shelled corn being ones more frequently used. Cane and beet molasses can be used to enhance the energy supply and the palatability of the feed mixture.

By blending together all the forages, grains, commodities and protein and mineral-vitamin supplements, cows are less able to selectively consume individual ingredients. Ideally, each bite of feed a cow consumes will contain the same proportion of forages and concentrates. It has been found that by feeding dairy herds a "total mixed ration" (TMR) not only does milk production improve, but feed costs decrease. Feeds previously hard to feed can now be fed and the cow health and/or reproductive performance improves.

Various types of TMR mixers are commercially available and generally fall into one of the following types:

Horizontal auger;
Vertical auger or screw;
Reel; and
Tumbling action within a drum.

Mixers with horizontal augers typically have one or more horizontal augers for mixing the feed ingredients. With multiple-auger mixers, the mixing action occurs when one or two of the augers counter-rotates, moving the feed in opposition to an adjacent auger. Knife sections are often attached to auger flights to cut or tear long stemmed alfalfa hay into pieces of three to four inches in length. However, many horizontal auger mixers do not handle grass hay or baleage well in that these types of feeds tend to wrap around the augers.

Typical prior art vertical auger mixers consist of a tub having a single, center auger or tapered screw. The center auger may typically be powered by a transmission and planetary gearbox. These mixers can make TMR rations in which all the forage is dry hay. Knife sections attached to the flights of the center auger and movable shear or restrictor plates on the tub wall help reduce the particle size of dry hay or baleage. Vertical auger mixers can generally handle large round bales of grass or alfalfa hay.

Reel mixers often combine a set of augers and a reel similar to a combine reel in a hopper. The rotary mixing system lifts feed past the wedging point on the lower side of the auger. The lifting action of the rotor is intended to minimize wedging of alfalfa hay and other long stem forages under the lower auger, potentially preventing the particle size of the forages being mixed from being reduced.

With tumble or chain and paddle mixers, spirals and pans on the interior of the drum lift and tumble the ration. Loading and unloading occurs at different ports on the mixer. Chain and paddle mixers consist of a tub with a chain and paddles on a conveyor that are used to tumble the ration from one end to the other. Some configurations of both types of mixers use a central auger that circulates the feed, moving it to the front of the mixer, where it is either remixed in the tumbling action or delivered to the unloading port. One advantage of this type of mixer over auger or reel mixers is that there is less wear and lower power requirements.

Examples of horizontal mixers are found in the Walter U.S. Pat. No. 3,173,582, the Neier U.S. Pat. No. 5,143,310 and the Mohrlang U.S. Pat. No. 4,707,140.

Likewise, vertical auger mixers are disclosed are the Rowe et al. U.S. Pat. No. 6,575,615, the Miller U.S. Pat. No. 5,240,321, the Schuler U.S. Pat. Nos. 5,601,362 and 5,647,665 and the Stone U.S. Pat. No. 5,429,436.

A tumbler-style mixer is found in the Rule '492 patent.

Mixers can also be classified as being either movable or stationary. The aforementioned Miller '321 patent exemplifies a stationary installation whereas the Rowe et al. '615, the Schuler '362 and '665 and the Stone '436 are all examples of transportable trailer-mounted mixers.

A problem exists with stationary mixers of the vertical auger type in that they must be especially designed to accommodate a placement relative to infeed and discharge conveyors commonly used with such mixers. Also, surrounding building structures must also be taken into account. This presents a problem for the mixer manufacturer in that the location of the discharge door of the mixer tub must conform to a customer's particular layout.

To insure that feed ingredients are mixed in a desired proportion, it would be advantageous that the mixing tub incorporate a scale whereby the weight of each constituent added to the mixing tub is determinable.

The cost of manufacture of a stationary, vertical auger feed mixer can be reduced where a thinner gauge steel sidewall can be used. However, such thinner gauge sidewall may need a reinforcing flange surrounding the upper open end of the tub. In prior art machines, the reinforcing rim comprises an annular plate welded to the upper rim of the tub sidewall. A drawback of this approach has been the fact that feed tends to collect on the rim reinforcement structure that over time will rot, become moldy and may later enter a batch of feed being processed.

Another drawback of prior art, vertical auger, feed mixers is that the optimum auger speed for mixing is slower than that required for discharging the already mixed feed through the tub's discharge opening and on to a discharge conveyor leading to the animal's feeding site.

The present invention obviates each of the above-described shortcomings of the prior art.

SUMMARY OF THE INVENTION

The present invention provides a mixer for agricultural animal feed having a stationary base frame member on which is rotationally supported a frusto-conically shaped tub having a closed bottom wall of a predetermined diameter and an open top of a diameter greater than the predetermined diameter of the bottom wall. An auger having a vertically oriented shaft and a helical fin configuration has the shaft journaled for rotation in the closed bottom wall. A motor is mounted on the base frame external to the tub and is operatively coupled in driving relation to the shaft of the auger. Formed in the sidewall of the tub proximate its bottom is a discharge opening that is adapted to be closed and selectively opened by a movable door member.

A further feature of the invention is that a circular reinforcing band of a generally L-shaped angle bar is welded onto the sidewall of the tub proximate the open top, thus providing the desired reinforcement but without creating a shelf on which feed can collect and spoil.

In accordance with yet another aspect of the invention, the shaft of the auger is adapted to be driven through a planetary gearbox whose input is driven by the output of a two-speed gearbox powered by one and possibly two electric motors. Because the frusto-conically shaped tub is designed to be rotatable with respect to the base frame member, the orientation of the tub's discharge opening can be moved through an angle of about 180° to satisfy a user's installation requirements.

DESCRIPTION OF THE DRAWINGS

Further features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
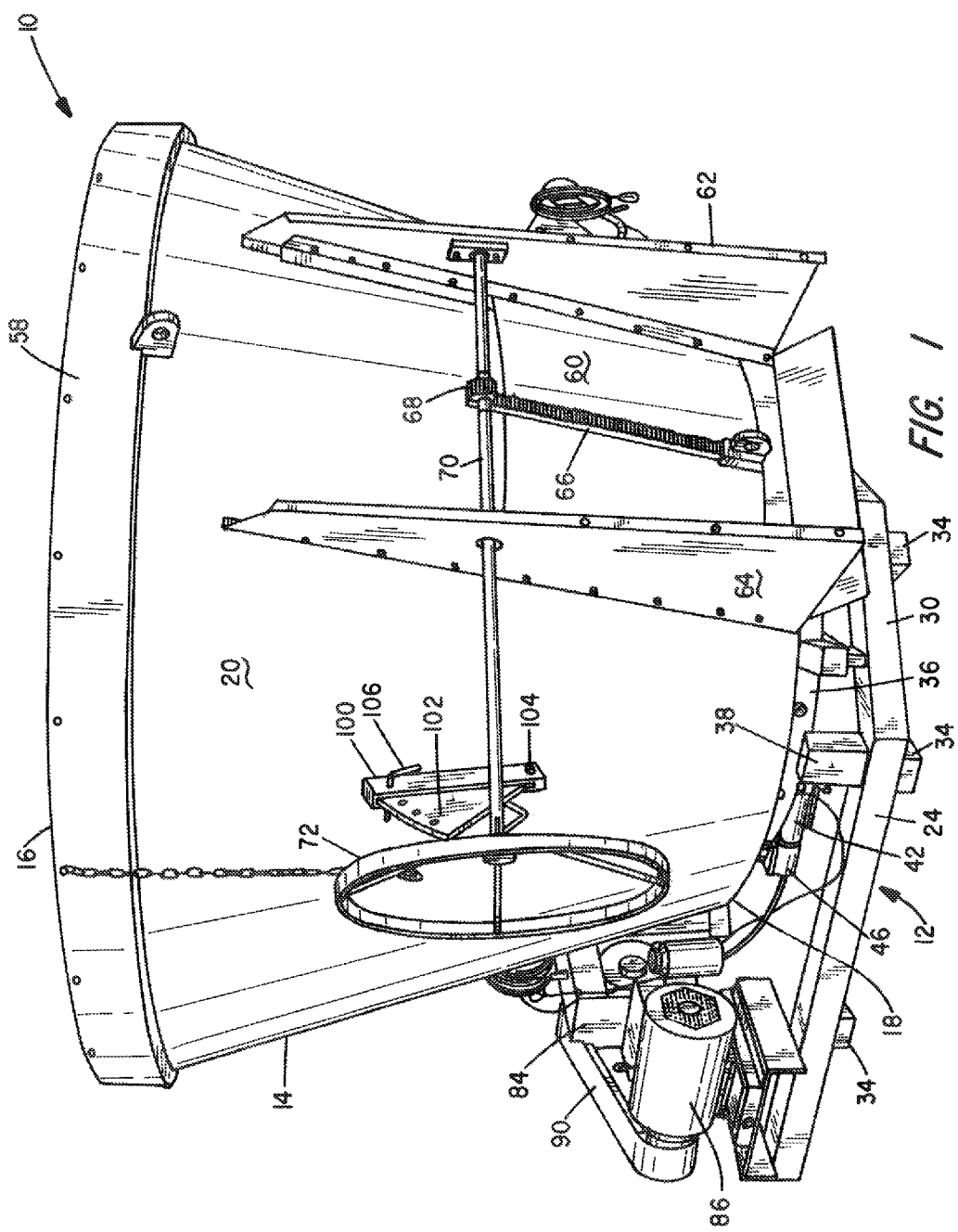
FIG. 1 is a front perspective view of a preferred embodiment.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring first to FIG. 1, indicated generally by numeral 10, there is a preferred embodiment of a vertical auger feed mixer constructed in accordance with the present invention. It is seen to comprise a base frame 12 on which is supported a frusto-conical shaped tub 14 having an upper open top 16 and a closed lower bottom 18. The inwardly and downwardly sloping sidewall 20 is fabricated from steel, preferably, but without limitation, 3/16 in. steel plate.

The base frame 12 comprises a weldment of steel tubes having rectangular cross-sections including a rear base frame member 22, a left side frame member 24, a right side frame member 26, an angled right front frame member 28, an angled left front frame member 30 and a connecting front frame member 32. The left and right side frame members 24, 26 are welded to opposed ends of the rear base frame member 22 and thereby held in parallel spaced relation to one another. Welded to the opposite ends of the left and right side members from the rear base member are the angled left and right members 30 and 28. The opposite ends of the angled right and left front members 28 and 30 are welded to the connecting front member 32.

The base frame 12 is elevated with respect to the ground by feet, as at 34, that are welded to the undersurface of the left side member 24, the right side member 26 and the connecting front member 32.

Concentrically disposed on the undersurface of the bottom wall 18 of the tub 14 is a steel ring 36. The ring 36 includes a plurality of regularly spaced apertures 37 along its circumference, the purpose for which will become clear as the description continues. Turning to the enlarged detail view of FIG. 5, welded to and projecting upwardly from the left side frame member 24 of the base frame 12 is a vertically extending leg 38 terminating in a cylindrical tube 40 and supported within the internal diameter of the cylindrical tube 40 is a first end of a electronic load cell member 42. An opposite end 44 of the load cell 42 fits into a sleeve 46 and a T-shaped bracket 48 is welded to the outer upper surface of the sleeve 46. As can be further seen in FIG. 5, a bottom edge of the ring 36 rests upon the T-bracket 48.

Figure 4:
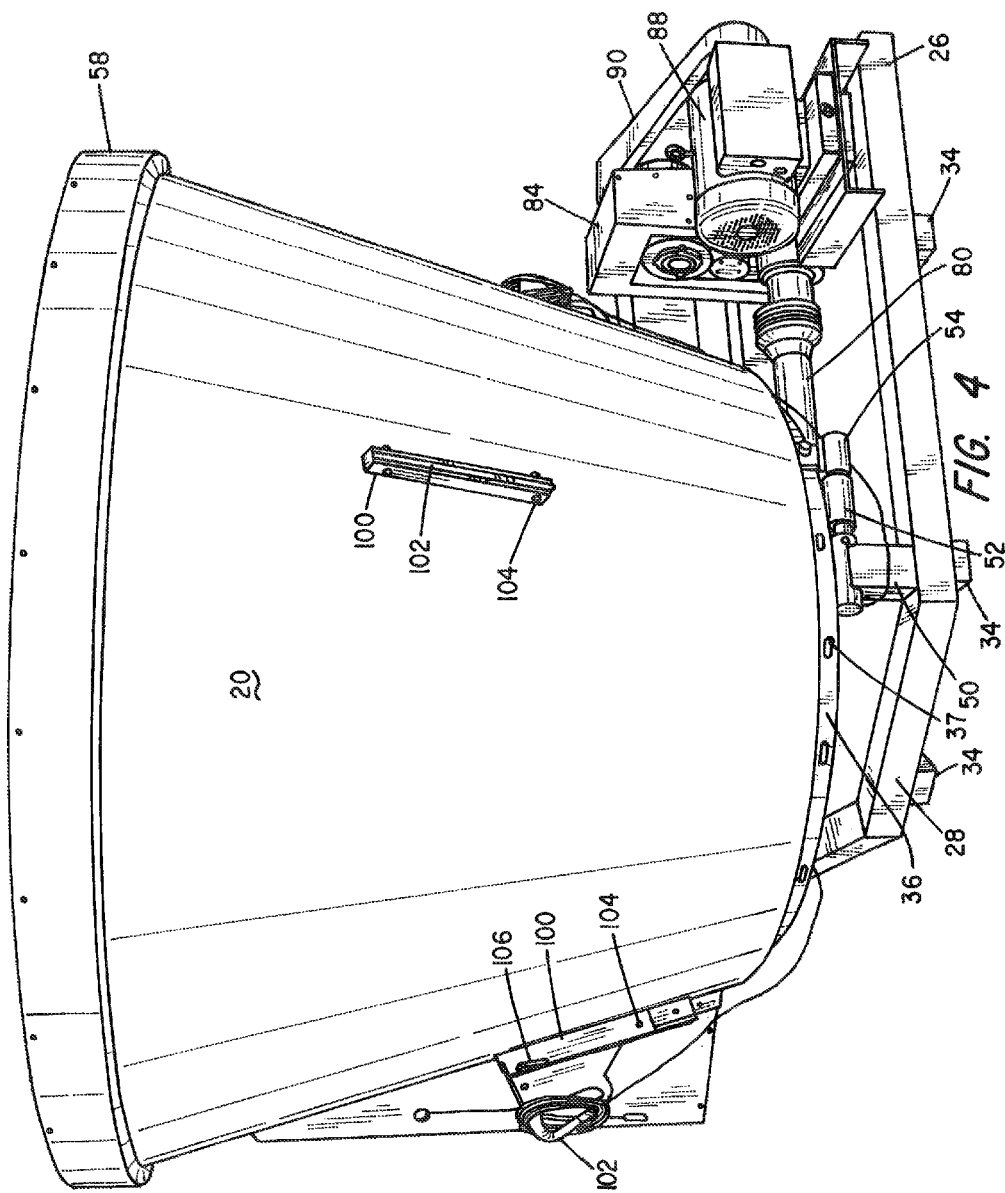
FIG. 4 is a right side view thereof.

Referring to FIG. 4, it may be observed that the right side member 26 of the base also has an upwardly projecting leg 50 supporting a load cell 52 with a T-bracket 54 secured to the opposite end of the cantilevered load cell 52.

A third such leg/load cell/T-bracket combination (not shown) is associated with the connecting front member 32 of the base 12 such that the three T-brackets define a plane on which the lower edge of the steel ring 36 rests.

Figure 2:
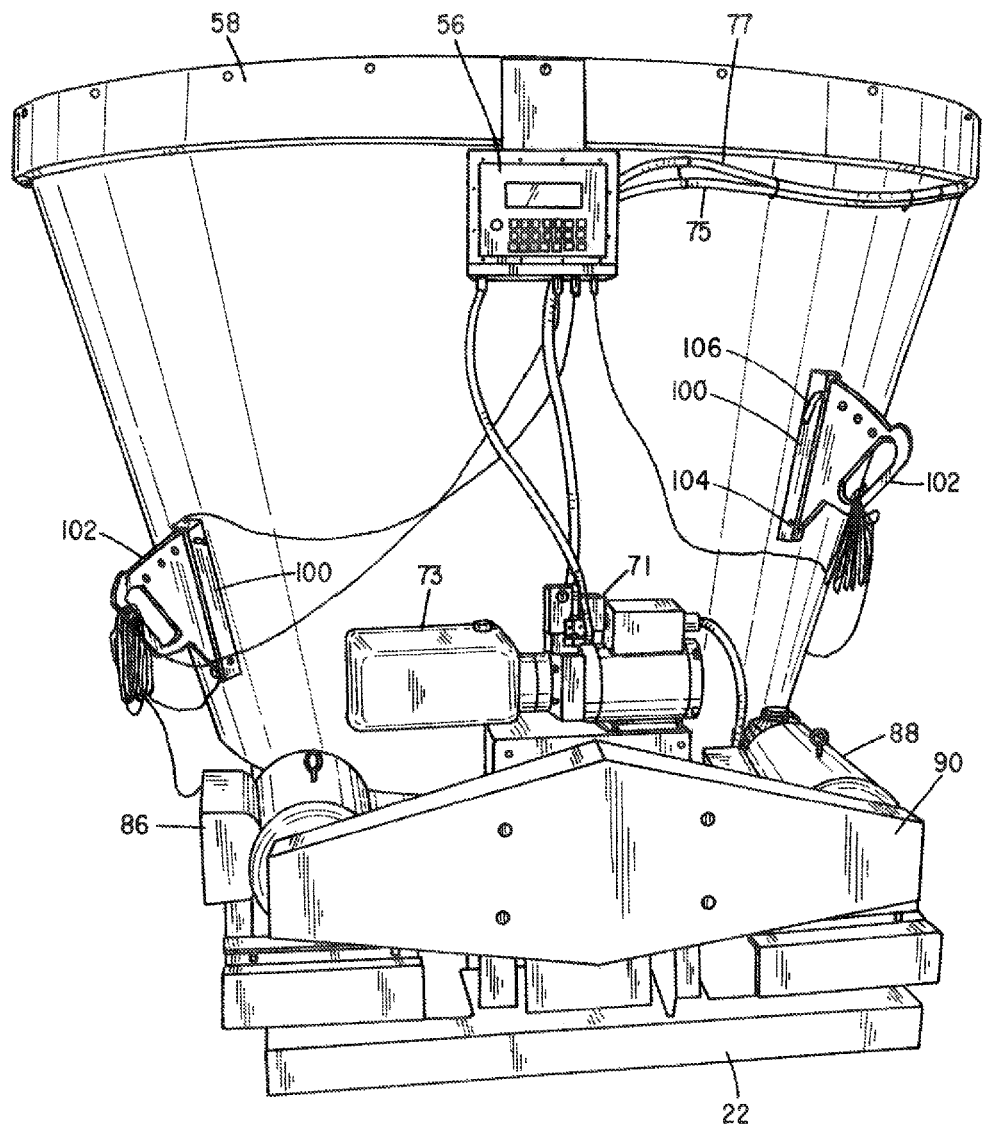
FIG. 2 is a rear view thereof.
Figure 5:
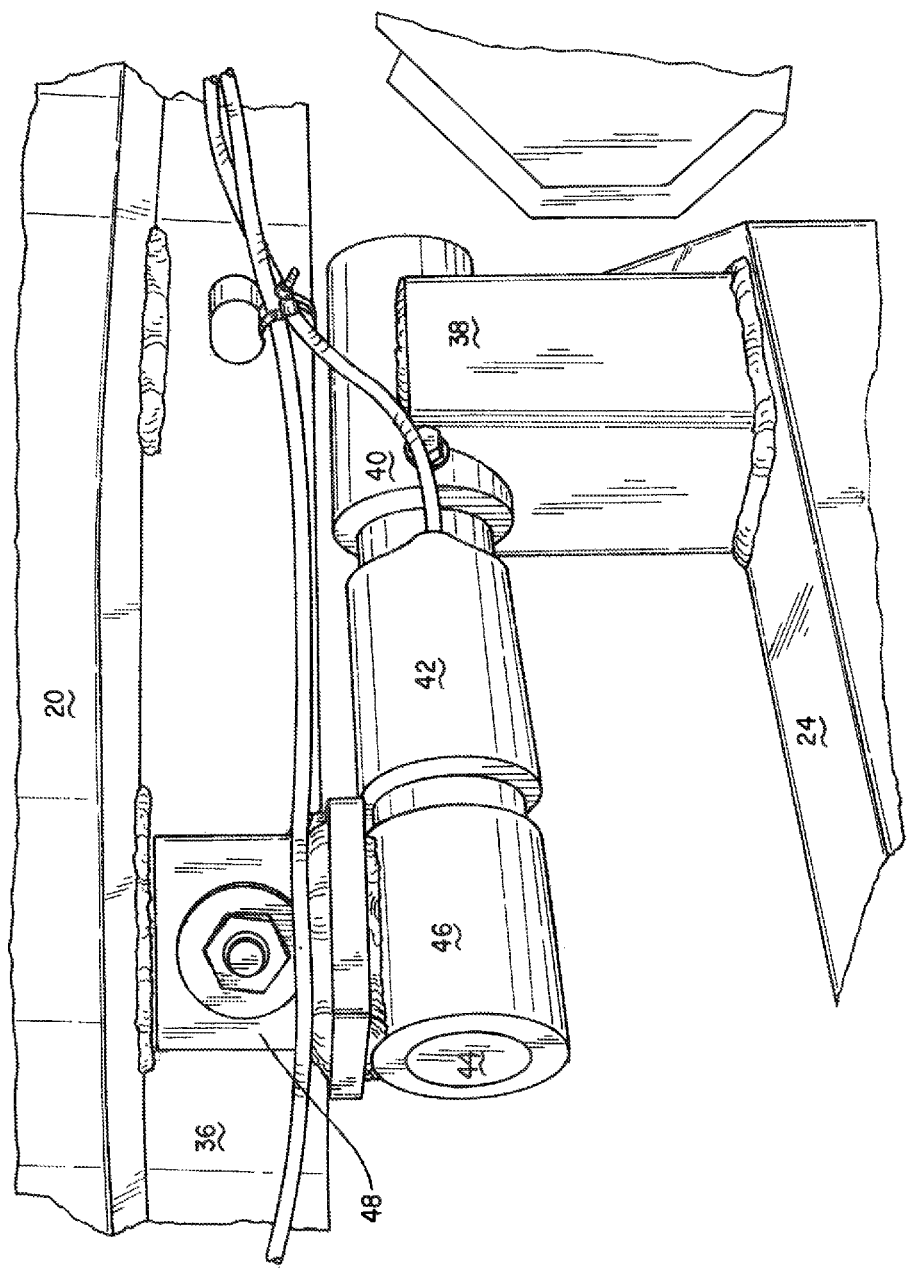
FIG. 5 is a detail view showing the load cell based tub support.

Because of the manner in which the three load cells are cantilevered from the cylindrical tubes as at 40 in FIG. 5, the weight of the tub assembly 14 and contents of the tub function to deflect the load cell and produce an output signal that is fed to a computer module 56 via wires 57 (FIG. 2). The computer can be placed at a convenient location and is programmed to function as a scale and produce a digital readout on a screen of the tare weight of an empty tub and the gross weight of a tub including contents so that the net weight of the contents only can be displayed.

Surrounding the upper rim of the tub 14 is a reinforcing band 58 formed from angle iron having a generally L-shaped cross-section that is skip-welded to the tub wall to eliminate thermal distortion. The reinforcing band 58 is designed to allow an extension ring (not shown) of a about one to two feet in height to be bolted to the top of the tub to thereby increase its capacity. The attachment by welding of the angle bracket with the lower leg of the L turned inward against the tub creates only a small horizontal surface area at the joint between the tub and the extension ring on which feed material can collect.

Formed through the sidewall 20 of the tub 14 proximate its bottom 18 is a discharge opening through which the mixed feed can exit onto a take-away conveyor leading to animal feeding stations. The discharge opening is hidden from view in FIG. 1 by a vertically movable door member 60. The mechanism for raising and lowering the door 60 relative to the discharge opening will next be described.

Bolted to and extending outwardly from the outer surface of the tub sidewall 20 are triangularly-shaped door guideways 62 and 64. The opposed side edges of the door 60 slidingly fit within the guideways. Affixed to the exposed outer surface of the door 60 is a gear rack 66 that is designed to cooperate with a pinion gear 68 that is mounted on a shaft 70 journaled for rotation with respect to the door guideways 62 and 64. The shaft 70 is adapted to be manually rotated by turning a large diameter wheel member 72 affixed to the end of the shaft 70. When the wheel 72 is rotated clockwise when viewed as in FIG. 1, the door 60 will be raised to expose the discharge opening and allow mixed feed material to exit therethrough. Likewise, counterclockwise rotation of the wheel 72 with the door 60 in its raised disposition will effect reclosure of the door. In the view of FIG. 1, a safety pane like panel 65 in FIG. 7 has been omitted to allow viewing of the door actuating mechanism.

While a purely mechanical lift for the door is shown in FIG. 1, those skilled in the art can appreciate other ways of raising and lowering the door 60. For example, a hydraulic cylinder and motor-driven hydraulic pump can readily be substituted.

Figure 7:
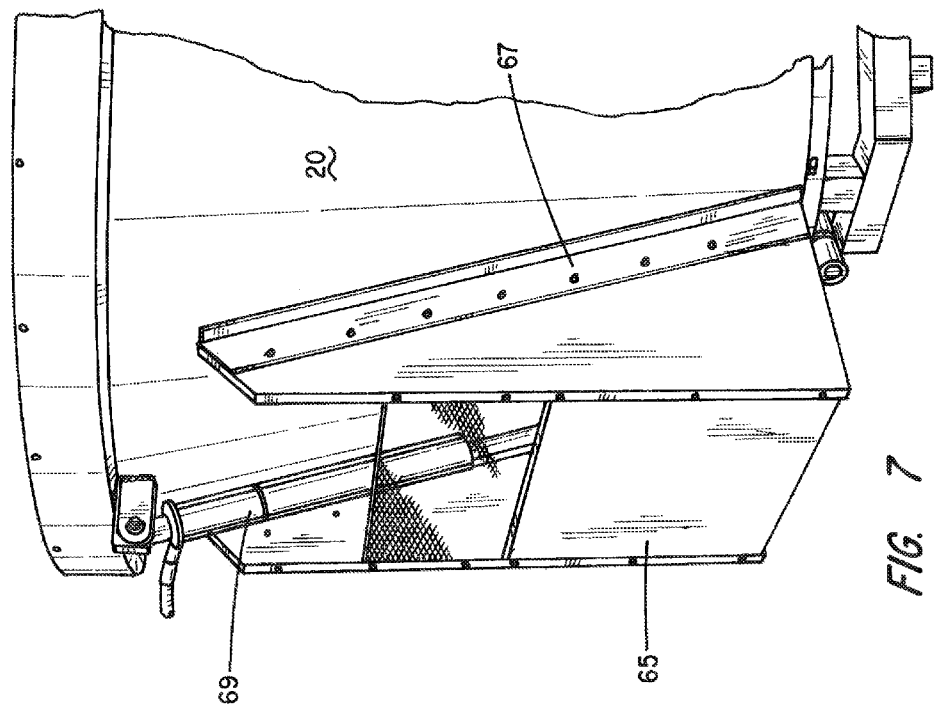
FIG. 7 shows an alternative discharge door operator.

FIG. 7 shows the tub 14 with a chute structure 65 bolted to angle brackets 67 that are welded to the outer wall 20 of the tub. The chute structure 65 has an open bottom and is placed in covering relation with respect to a vertically movable door member like door 60 in FIG. 1 and that is adapted to be raised and lowered through actuation of a hydraulic cylinder 69. The view of FIG. 2 shows an electric motor driven hydraulic pump assembly 71 having a tank or reservoir 73 and hydraulically coupled via lines 75 and 77 to the cylinder 69 in FIG. 7. A control for the motor/pump assembly 71 is identified by numeral 79 in FIG. 3. The chute assembly 65 serves as both a safety guard and as a chute for directing discharged mixed feed onto a take-away conveyor (not shown) that would have its input end disposed beneath the open bottom of the chute 65.

Figure 3:
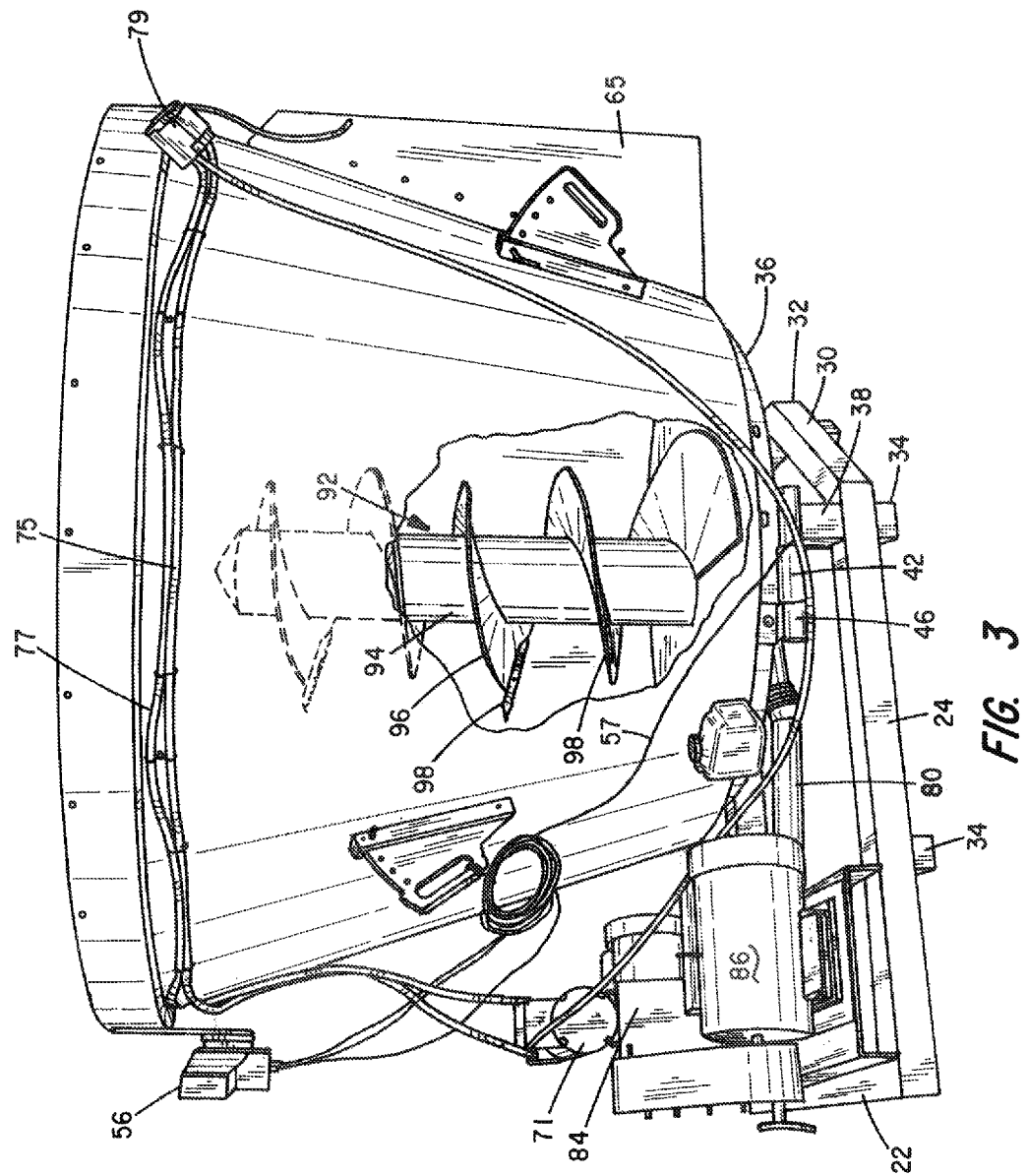
FIG. 3 is a left side view thereof.

The wall of the tube in FIG. 3 is broken away to illustrate the construction of the auger designed for use in the mixer 10. It is indicated generally by numeral 92 and is seen to comprise a vertically disposed drum 94 and welded to the drum is a helical fin 96 of ½ in. thick steel having a lower, an intermediate and an upper convolution. The radius of the lower convolution is designed to be only slightly less than the inner radius of the tub 14 proximate the floor 18 thereof so that the lower convolution can sweep the entire floor of the tub as it is made to rotate and lift the feed materials. The top of the auger is about a foot lower than the upper edge of the tub. Affixed to the intermediate convolution and the upper convolution of the helical fin 96 are serrated cutting blades as at 98 which function to cut or chop long strands of hay, alfalfa and other forages into smaller lengths allowing such materials to better mix with seed grains and other commodities making up the desired TMR.

Figure 6:
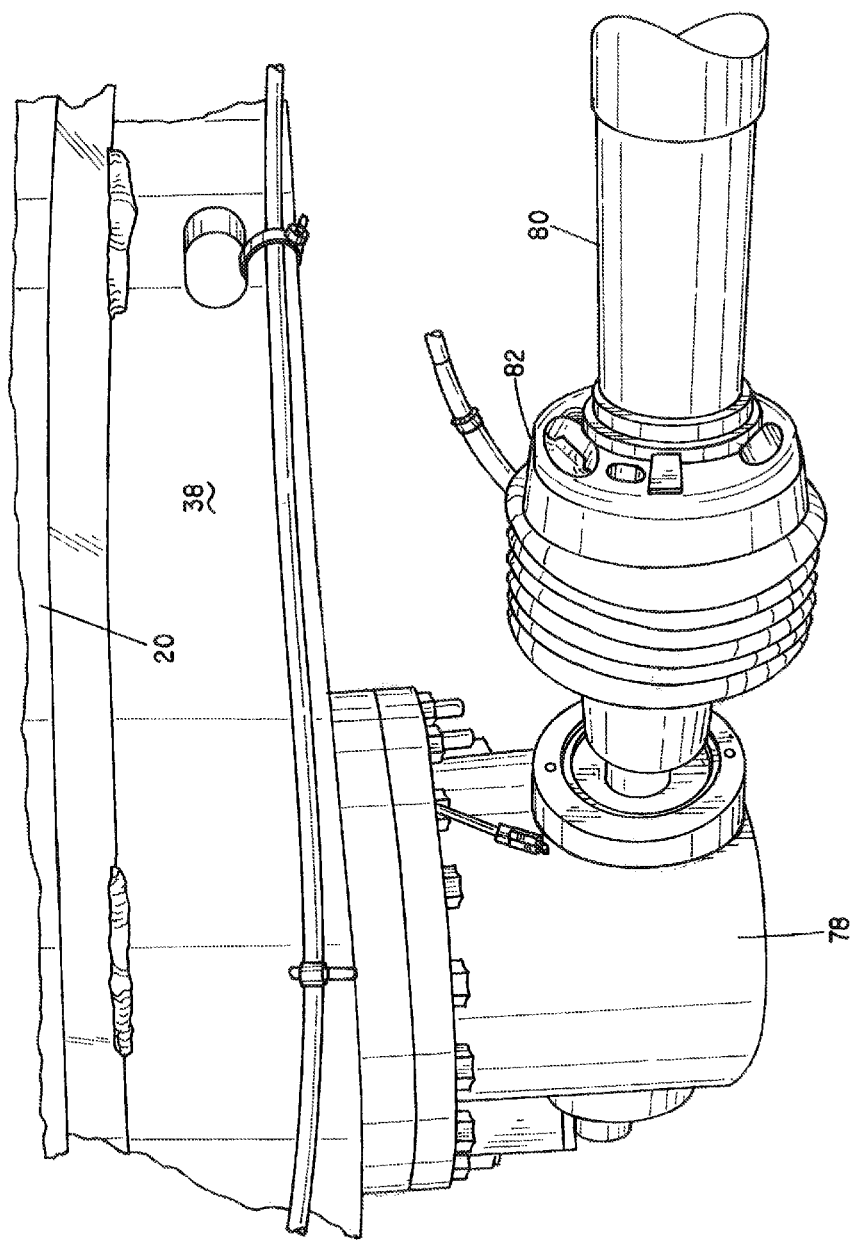
FIG. 6 is a detail view of the planetary gear auger drive structure.

As seen in FIG. 3, the mixing auger 92 is centered with respect to the bottom 18 of the frusto-conical shaped tub 14. The shaft of the auger is journaled for rotation on the floor of the tub and, as seen in FIG. 6 passes through an opening in the tub's bottom wall and connects to a planetary gearbox 78 bolted to the undersurface of the tub's bottom wall 18. An input gear of the planetary gearbox 78 is adapted to be driven by a driveshaft 80 and a universal joint 82.

As can be seen in FIG. 3, the driveshaft 80 is arranged to be driven from a two-speed gearbox 84. The input shaft of the gearbox 84 has a four groove V pulley keyed thereto and is adapted to be driven by one or both of AC motors 86 and 88 using V-belts (not shown). If single phase AC motors are used, then two such motors are preferably used. However, if a three phase AC motor is used, only one is needed. A shroud, as at 90, is used to shield the shafts and V-belts for purposes of safety.

Located circumferentially along the sidewall 20 of the tub 12 at different elevations is a plurality of vertical slits framed by hinge brackets 100. Arcuate plates 102 are pivotally joined to the hinge brackets 100 by a pivot pin, as at 104, allowing the plate 102 to swing into the interior of the tub to an adjustable degree set by a pin 106 cooperating with a series of apertures through the plates 102 that are radially aligned relative to the pin 106. The plates 102 when projecting into the tub serve to direct the feed materials being mixed into the auger structure as the auger rotates.

Without limitation, the tub may have an upper diameter of 96 inches, a lower diameter of 60 inches and a height of 60 inches. Such a tub has a volume of approximately 125 cubic feet and can contain approximately 6.48 cubic yards of feed materials. With a two-foot extension ring added, the tub will hold 275 cubic feet. Using the two-speed gearbox, the auger may be driven at approximately 20 rpm as mixing and cutting occur. When the mixture is ready to be used, the movable door 60 is raised and the auger is driven at a higher speed of approximately 40 rpm causing the feed material to be moved by centrifugal force through the exit opening and onto a take-away conveyor.

In order to adapt the mixer 10 to a particular layout of a customer's infeed and discharge conveyors, at the time of installation, bolts passing through selected ones of the apertures 37 used to secure the steel ring 36 stationary to the T-brackets 48 are removed and the tub is manually rotated on the horizontal leg of the T-brackets relative to the base until the discharge opening and door are appropriately aligned with the discharge conveyor and then the bolts that had been removed are again replaced. It also becomes necessary to unbolt the planetary gear 78 from the bottom of the tub and reattach it once the discharge door is properly oriented so that the drive shaft 80 remains aligned with the output of the two-speed gear box 84. In that the ring 36 has bolt apertures 37 at regularly spaced intervals along the circumference thereof, the discharge door is positionable over approximately 180° of rotation of the tub relative to its base.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:
1. A mixer for agricultural animal feed comprising:
(a) a stationary base frame member;
(b) a frusto-conically shaped tub having a closed bottom wall of a predetermined diameter and an open top of a diameter greater than said predetermined diameter, the tub being supported on and rotatable with respect to the stationary base frame member;

(c) an auger having a vertically oriented shaft and a helical fin, the shaft being journaled for rotation in the closed bottom wall;

(d) a motor mounted on the base frame member operatively coupled in driving relation to the shaft of said auger;

(e) said tub having a discharge opening formed in a side wall of the tub, rotation of the tub on the stationary base frame permitting the discharge opening to be selectively circumferentially positioned to satisfy a user's installation requirements; and (f) a door member for selectively blocking and unblocking the discharge opening.

2. The mixer of claim 1 wherein the open top is encircled by a reinforcing band, said band having an L-shaped cross-section.

3. The mixer of claim 1 wherein the motor is an electric motor that is operatively coupled to the shaft of the auger through a multi-speed gearbox mounted on the base frame member.

4. The mixer of claim 3 and further including:

(a) a planetary gearbox having an output connected to the auger and an input driven by an output of the multi-speed gearbox.

5. The mixer of claim 4 wherein the auger is driven at a first lower speed during mixing of feed constituents and at a second higher speed during discharge of the mixed feed from the tub.

6. The mixer as in claim 1 and further including a plurality of load cells disposed between the closed bottom wall of the tub and the base frame member whereby feed constituents deposited in the tub through the open top can be weighed.

7. The mixer of claim 1 wherein the door member is mechanically movable.

8. The mixer of claim 1 wherein the door member is hydraulically movable.

9. The mixer of claim 1 and further including at least one generally vertically oriented slot formed through the sidewall circumferentially offset from the discharge opening and a plate member extending through the at least one slot and pivotally joined to the tub sidewall, the plate member having means for selectively setting the extent to which the plate member can extend into a volume defined by the tub sidewall.

10. The mixer of claim 1 and further including cutting blades affixed to the fin of the auger.

11. The mixer of claim 10 wherein a lowermost convolution of the auger fin has a radius to sweep the closed bottom of the tub over substantially an entire area thereof when the auger shaft is driven.

* * * * *